United States Patent
Ohtsu et al.

[11] Patent Number: 6,132,354
[45] Date of Patent: Oct. 17, 2000

[54] AUTOMATIC BALL BALANCER FOR ROTATING MACHINE

[75] Inventors: Shinki Ohtsu, Naka-gun; Mitsuyuki Ishikawa; Masanori Yoshioka, both of Hitachinaka, all of Japan

[73] Assignee: Hitachi Koki Co., Ltd., Japan

[21] Appl. No.: 08/965,768

[22] Filed: Nov. 7, 1997

[30] Foreign Application Priority Data

Nov. 8, 1996 [JP] Japan .................................. 8-296294
Apr. 18, 1997 [JP] Japan .................................. 9-101775

[51] Int. Cl.$^7$ ........................................................ B04B 9/14
[52] U.S. Cl. ............................ 494/16; 494/20; 494/82; 68/23.2; 74/573 R
[58] Field of Search .................... 494/16, 20, 82; 210/144, 363; 74/572, 573 R, 574; 422/72; 68/23.1–23.3

[56] References Cited

U.S. PATENT DOCUMENTS

| | | | |
|---|---|---|---|
| 3,679,130 | 7/1972 | Mayo et al. | 494/20 |
| 3,692,236 | 9/1972 | Livshitz et al. | 74/573 R |
| 3,921,898 | 11/1975 | Finkel | 494/82 |
| 4,075,909 | 2/1978 | Deakin | 74/573 R |
| 4,433,592 | 2/1984 | Tatsumi et al. | 210/144 |
| 4,449,966 | 5/1984 | Piramoon | 494/82 |
| 4,547,185 | 10/1985 | Hellekant | 494/82 |
| 5,207,634 | 5/1993 | Greenstein | 494/82 |
| 5,592,858 | 1/1997 | Taylor | 74/573 R |
| 5,724,862 | 3/1998 | Hannah et al. | 73/573 R |
| 5,746,069 | 5/1998 | Kim | 68/23.2 |
| 5,806,349 | 9/1998 | Kim et al. | 68/23.2 |

FOREIGN PATENT DOCUMENTS

| | | | |
|---|---|---|---|
| 54-120957 | 9/1979 | Japan | 494/82 |
| 56-130249 | 10/1981 | Japan . | |
| 58-37353 | 3/1983 | Japan | 68/23.2 |
| 58-137638 | 8/1983 | Japan | 68/23.2 |
| 59-183846 | 10/1984 | Japan | 494/82 |
| 345322 | 5/1960 | Switzerland | 68/23.2 |
| 555309 | 7/1977 | U.S.S.R. | 74/573 R |
| 577418 | 10/1977 | U.S.S.R. | 74/573 R |

*Primary Examiner*—Charles E. Cooley
*Attorney, Agent, or Firm*—Parkhurst & Wendel, LLP

[57] ABSTRACT

A ball balancer for minimizing a dynamic unbalance of a moving part of a rotating machine such as a centrifuge is provided. The ball balancer includes a rotary balancer casing having disposed therein balls. The rotary balancer casing is mounted on the moving part coaxially with an axis of rotation thereof and has formed therein an inner side wall which is so curved that the balls are lifted away from the bottom of the balancer casing along the inner side wall by the centrifugal force and biased toward the opposite side of an unbalanced mass of the moving part when the rotational speed of the moving part exceeds a resonant speed that is a rotational speed of the moving part when matched with a natural frequency of the moving part, thereby counterbalancing the unbalanced mass of the moving part. In an alternative form, the balls include a first group having a large diameter and a second group having a small diameter. The large-diameter balls and the small-diameter balls are arranged alternately. Each of the large-diameter balls is lifted on adjacent one of the small-diameter balls by the reaction force produced by a shift in center between one of the large-diameter balls and adjacent one of the small-diameter balls arranged on the bottom of the balancer casing and biased toward the opposite side of the unbalanced mass of the moving part when the rotational speed of the moving part exceeds the resonant speed.

10 Claims, 9 Drawing Sheets

AUTOMATIC BALL BALANCER FOR ROTATING MACHINE

BACKGROUND OF THE INVENTION

1. Technical Field of the Invention

The present invention relates generally to an automatic balancer for a rotating machine, and more particularly to an improved structure of a ball balancer designed to automatically equalize loads acting on a moving part of a rotating machine in a radius direction during rotation.

2. Background of Related Art

Conventional automatic balancers used in a rotating machine are of two different types: a liquid balancer having an annular casing filled with the liquid and a ball balancer having balls disposed within an annular casing.

FIGS. 21 and 22 show a conventional ball balancer, as taught in Japanese Patent Second Publication No. 56-130249, which includes a large number of balls 21 disposed within an annular casing 40 over 30% to 60% of the periphery of the annular casing 40. When the annular casing 40 spins at high speed, it will cause the balls 21 to be biased toward the opposite side of an unbalanced mass 15 to provide a counterbalance with the unbalance mass 15, thereby minimizing oscillation of the casing 40 during rotation.

A centrifuge, as an example of rotating machines, is designed to revolve a rotor at high speed to separate a mixture such as a liquid solution put in the rotor into a higher density component and a lower density component so that the higher density component may be settled away from the center of the rotor, while the lower density component may be settled around the center of the rotor. A sudden change in speed of the rotor during acceleration or deceleration will cause the separated components within the rotor to be stirred so that they are mixed. In order to avoid this problem, the acceleration or deceleration is controlled so as to be changed slowly during rotation of the rotor. In general, the centrifuge rotates at a high speed greater than a resonant speed initiating oscillation of the rotor. When the resonant speed is reached during a slow change in acceleration or deceleration of the rotor, it produces a great vibration of resonance frequency. To suppress this vibration, a damper is commonly installed between a drive mechanism for the rotor and the casing. However, when the centrifuge is operated to revolve the rotor which is unbalanced, it is difficult to absorb the vibration only using the damper, thus resulting in a large-scale vibration or noise caused by resonance of the rotor. Further, when a dynamic unbalance of the rotor continues during high-speed rotation, it will lead to eccentric rotation of the rotor, thereby increasing loads which bends a rotor shaft and damages a bearing of the rotor shaft. In order to avoid this problem, in a conventional centrifuge, a difference in weight between mixtures disposed on opposite sides of a rotor is minimized to counterbalance the rotor during rotation. This balance adjustment is usually made by adjusting the amounts of the mixtures or adding a balance weight to the rotor and wastes the time of an operator undesirably.

It is known in the art that a rotating system including a rotor generates great vibrations when the speed of the rotor reaches a resonant speed (i.e., when the rotor speed coincides with a natural frequency of the rotating system). When the rotor speed is less than the resonant speed, the center of gravity of the rotating system is offset from the center of the rotor. When the rotor speed exceeds the resonant speed, the phase of vibration of the rotating system is shifted 180°, so that the center of gravity of the rotating system is shifted to the center of rotation from the center of the rotor.

Therefore, when a centrifuge equipped with the ball balancer, as shown In FIGS. 21 and 22, is operated to accelerate a rotor, the rotor spins slowly while swinging toward an unbalanced mass until the rotor speed reaches the resonant speed, so that the balls are moved toward the unbalanced mass, resulting in an increase in dynamic unbalance of the rotor. Specifically, the resonance vibration becomes greater than would be the case without use of the ball balancer, which may cause the rotor to be brought into contact with an outer casing, resulting in unwanted mechanical noise.

When the rotor speed exceeds the resonant speed, the rotor swings in a direction opposite the unbalanced mass, thereby causing the balls to be collected on the opposite side of the unbalanced mass to decrease the unbalanced mass. This results in quick reduction in vibration of the rotor to obtain a dynamic balance of the rotor.

An increase in overall weight of the balls or diameter of the annular casing into order to increase an allowable unbalanced mass causes the resonance vibration of the rotor to be increased by the ball balancer even when an unbalanced mass is small. Specifically, it is difficult to reduce the vibration of the rotor by increasing the overall weight of the balls or diameter of the annular casing.

Accordingly, the conventional ball balancer, as shown in FIGS. 21 and 22, is effective to achieve a dynamic balance of the rotor when the rotor speed is above the resonant speed, but has the disadvantage that the ball balancer works to increase the vibration of the rotor when the rotor speed is less than the resonant speed.

SUMMARY OF THE INVENTION

It is therefore a principal object of the present invention to avoid the disadvantages of the prior art.

It is another object of the present invention to provide an automatic balancer designed to achieve a dynamic balance of a moving part of a rotating mechanism over a wide range of rotational speed of the moving part.

According to one aspect of the present invention, there is provided a ball balancer for controlling a dynamic balance of a moving part of a rotating machine which comprises: (a) a rotary balancer casing mounted on an axis of rotation coaxial with an axis of rotation of the moving part of the rotating machine, the rotary balancer casing including a cylindrical inner side wall and a bottom and having an annular race formed on the bottom along a periphery of the cylindrical inner side wall; (b) balls disposed on the annular race of the rotary balancer casing over a first angular range; and (c) a means for holding the balls arranged on the annular race over the first angular range within a lower-speed range of rotation of the moving part of the rotating machine less than or equal to a resonant speed that is a rotational speed of the moving part when matched with a natural frequency of a rotating system including the ball balancer and the moving part and that induces oscillation of the rotating system to increase, when the rotational speed of the moving part is increased out of the lower-speed range, the means biasing the balls to the opposite side of an unbalanced mass of the moving part, which initiates oscillation of the moving part, within a second angular range smaller than the first angular range to minimize a dynamic unbalance of the moving part caused by the unbalanced mass.

In the preferred mode of the invention, the first angular range occupies substantially the overall length of the annular race.

The cylindrical inner side wall includes an upper portion and a lower portion which constitute the means. The lower portion is so curved outward of the rotary balancer casing at a given radius of curvature that an interval between the aids of rotation of the rotary balancer casing and an inner surface of the lower portion in a direction perpendicular to the axis of rotation of the rotary balancer casing is increased toward the upper portion and that an angle between a tangent passing through a point on the inner surface of the lower portion with which each of the balls is in contact and a vertical line allows the balls to be lifted away from the annular race along the inner surface of the lower portion by centrifugal force produced when the rotational speed of the moving part of the rotating machine exceeds the resonant speed.

The upper portion of the cylindrical inner side wall is curved at the same radius of curvature as that of the lower portion and an interval between the axis of rotation of the rotary balancer casing and an inner surface of the upper portion in a direction perpendicular to the axis of rotation of the rotary balancer casing is decreased as leaving the lower portion.

The upper portion of the cylindrical inner side wall may alternatively be curved at a radius of curvature greater than that of the lower portion.

The upper portion of the cylindrical inner side wall may alternatively have a flat inner surface extending parallel to the axis of rotation of the rotary balancer casing.

In a modified form of the invention, the cylindrical inner side wall also includes a stepped portion. The upper portion has the inner surface extending parallel to the axis of rotation of the rotary balancer casing. The lower portion has the inner surface inclined at a given angle to the axis of rotation of the rotary balancer casing so as to allow the balls to be lifted away from the annular race along the inner surface of the lower portion by centrifugal force produced when the rotational speed of the moving part of the rotating machine exceeds the resonant speed. The stepped portion extends between a lower periphery of the upper portion and an upper periphery of the lower portion and projects inward in a widthwise direction thereof from a lower end of the upper portion to an upper end of the lower portion.

The stepped portion may have formed thereon protrusions and recesses which are arranged alternately in a lengthwise direction thereof.

In a modified form of the invention, the balls includes a first group having a large diameter and a second group having a small diameter. The large-diameter balls and the small-diameter balls are arranged in alternate fashion. The cylindrical inner side wall of the rotary balancer casing extends vertically in parallel to the axis of rotation of the rotary balancer casing. The inner diameter of the cylindrical inner side wall and the difference in diameter between the large-diameter balls and the small-diameter balls are so determined that the large-diameter balls are lifted away from the annular race by centrifugal force acting on the large-diameter balls and the small-diameter balls when the rotational speed of the moving part is increased out of the lower-speed range.

According to another aspect of the invention, there is provided a centrifuge which comprises: (a) a rotating member; and (b) a ball balancer for controlling a dynamic balance of the rotating member. The ball balancer includes (1) a rotary balancer casing mounted on an axis of rotation coaxial with an axis of rotation of the rotating member, the rotary balancer casing including a cylindrical inner side wall and a bottom and having an annular race formed on the bottom along a periphery of the cylindrical inner side wall, (2) balls disposed on the annular race of the rotary balancer casing over a first angular range, and (3) means for holding the balls arranged on the annular race over the first angular range within a lower-speed range of rotation of the rotating member less than or equal to a resonant speed that is a rotational speed of the rotating member when matched with a natural frequency of a rotating system including the ball balancer and the rotating member and that induces oscillation of the rotating system to increase, when the rotational speed of the rotating member is increased out of the lower-speed range, the means biasing the balls to the opposite side of an unbalanced mass of the rotating member, which initiates oscillation of the rotating member, within a second angular range smaller than the first angular range.

In the preferred mode of the invention, the rotating member includes a rotor rotatably supported by a shaft. A motor is provided which revolves the rotor through the shaft. The ball balancer is mounted on the shaft between the rotor and the motor.

The rotor may include a rotor body and a cover. The rotor body has formed therein a plurality of chambers with openings for taking mixtures to be separated in and out. The cover is disposed on the rotor body to close the openings. The ball balancer may alternatively be mounted in the cover of the rotor.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
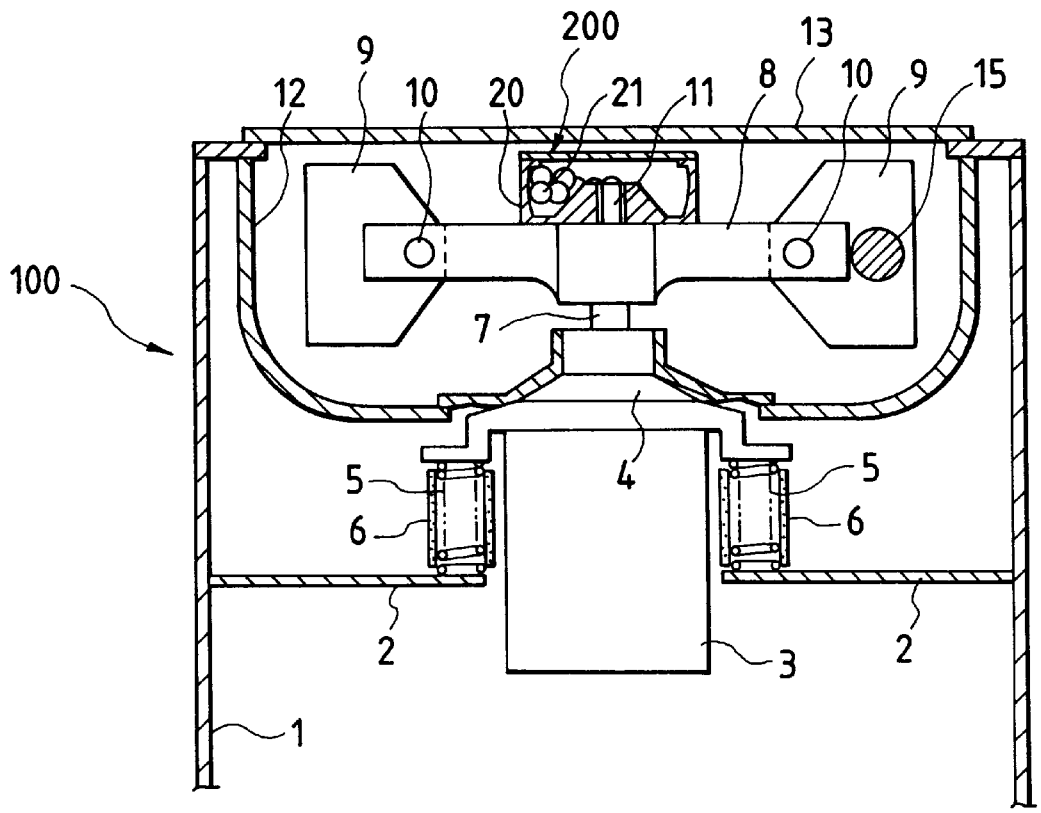
FIG. 1 is a vertical cross sectional view which shows a centrifuge equipped with a ball balancer according to the first embodiment of the invention.

Referring now to the drawings, particularly to FIG. 1, there is shown a centrifuge 100 equipped with a ball balancer 200 according to the invention.

The centrifuge 100 includes generally an outer casing 1, an inner base 2, and a cup-like inner casing 12. The inner base 2 is mounted within the outer casing 1. The inner casing 12 defines a chamber along with a cover 13 in which a rotor 8 is disposed. The rotor 8 is rotatably supported by a rotor shaft 7. The rotor shaft 7 is mounted in a bearing installed in a bracket 4 secured on a bottom wall of the inner casing 12 and connected to an electric motor 3. The motor 3 is installed on the bracket 4. Disposed between the bracket 4 and the inner base 2 are four damper assemblies each consisting of a rubber tube 6 and a spring 5 pressed in the rubber tube 6.

The rotor 8 has disposed on ends thereof buckets 9 for mixtures such as liquid solutions to be separated by rotation of the rotor 8. The buckets 9 are pivotably supported by pins 10. The ball balancer 200 includes a rotary hollow balancer body 20. The balancer body 20 is installed on a threaded shaft 11 connecting with the rotor shaft 7 and has disposed therein balls 21. The balancer body 20, the rotor 8, and the buckets 9 are rotated together by the motor 3 within the chamber defined by the inner casing 12 and the cover 13. The cover 13 is openable when the rotor 8 is at rest for taking the mixtures to be separated in and out of the buckets 9. FIG. 1 shows the rotor 8 spinning at high speed. The buckets 9 are urged outward in a horizontal direction by the centrifugal force produced by high-speed rotation of the rotor 8. The balls 21 are biased across an axis of rotation (i.e., the rotor shaft 7) to the opposite side of an unbalanced mass 15, that is a difference in mass between the mixtures put in the buckets 9, to ensure dynamic balance of the rotor 8. Specifically, a shift in center of gravity of the rotor 8 during rotation caused by the unbalanced mass 15 is corrected by the biased balls 21 so that the center of gravity of the rotor 8 lies on the rotor shaft 7.

In the centrifuge 100, the rotor 8 is induced to oscillate at a resonant speed which is determined by the mass and moment of inertia of the motor 3 and the rotor 8 and the spring constant and damping coefficient of the damper assemblies consisting of the springs 5 and the rubber tubes 6. Such vibrations may, thus, be attenuated by optimizing the damping coefficient.

Figure 2:
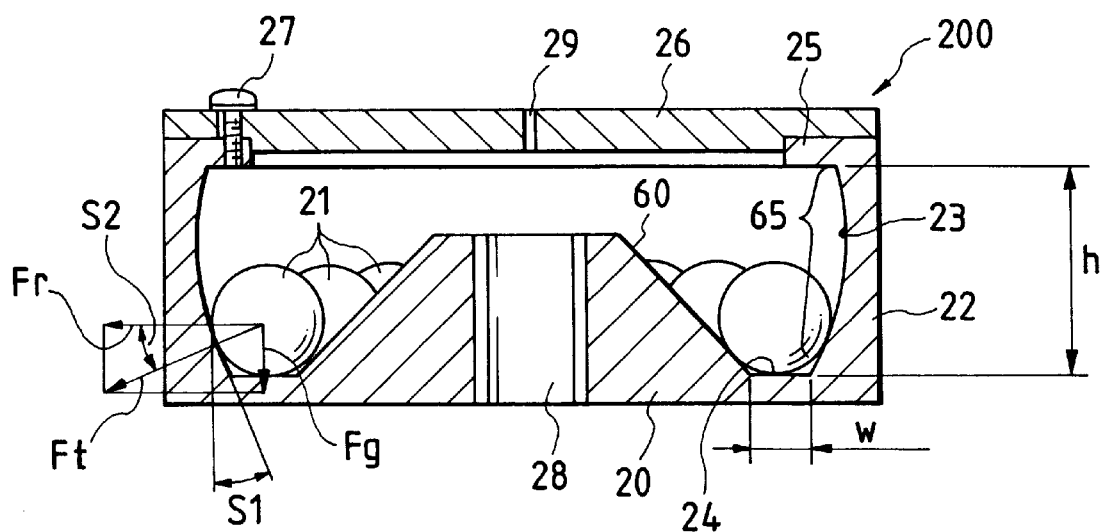
FIG. 2 is an expanded cross sectional view which shows the ball balancer in FIG. 1.

FIG. 2 shows the ball balancer 200 spinning at low speed.

The ball balancer 200 is designed to equalize loads acting on a rotating system including the rotor 8, the ball balancer 200, etc. in a radius direction during rotation. The balancer body 20 includes a hollow cylindrical portion 22, a frusto-conical central portion 60, and an annular bottom 24 between the cylindrical portion 22 and the frusto-conical central portion 60, and an annular stopper 25 extending inward from an upper end of the cylindrical portion 22. The cylindrical portion 22 has an inner side wall 65. The inner side wall 65 is so curved outward at a preselected radius of curvature that the interval between the vertical center line (i.e., the axis of rotation of the ball balancer 200) and the inner side wall 65 is increased up to a preselected level 23 and decreased above the level 23. The frusto-conical central portion 60 has formed in the center thereof a bore 28 in which internal threads are formed for engagement with the shaft 11 connecting with the rotor shaft 7. The annular bottom 24 has the width w which is smaller than the diameter of the balls 21 and which defines an annular race together with lower portions of the cylindrical portion 22 and the frusto conical central portion 60 along which the balls 21 are arranged in line. The balls 21 have substantially the same diameter and occupy the overall length of the annular race. Each of the balls 21 is made of steel, high-density resin, or high-density rubber. The lubricant or grease is applied to the inside of the balancer body 20 for avoiding wear and rust of the balls 21.

A cover 26 is installed on the annular stopper 25 through screws 27. The cover 26 has formed in the center thereof an air hole 29.

The distance h between the annular stopper 25 and the annular bottom 24 (i.e., the height of the inner side wall 65) is greater than or equal to about 1.4 to 2 times the diameter of the balls 21 so as to allow the balls 21 to be arranged in staggered fashion within the ball balancer 200 during high-speed rotation of the rotor 8.

The load acting on each of the balls 21 during rotation of the rotor 8 at low speed involves, as shown in FIG. 2, the gravitational force Fg and centrifugal force Fr. The resultant force Ft urges each ball 21 into constant engagement with the annular bottom 24 and the cylindrical side wall 23. The balls 21, as described above, occupy substantially the overall length of the annular race (i.e., the annular bottom 24), so that they are aligned along the annular race without being biased to the opposite side of the unbalanced mass 15.

Specifically, during low-speed rotation of the rotor 8, the balls 21 are all in contact with the annular bottom 24, and the angle S2 between the resultant force Ft and a horizontal line is greater than the inclination S1 of an inner surface of the cylindrical portion 22 (i.e., an angle between a tangent passing through a point on the inner side wall 65 with which each ball 21 contacts and a vertical line). When the rotor speed is increased to increase the centrifugal force Fr, and the angle S2 becomes smaller than the inclination S1, it will cause the balls 24 to be lifted away from the annular bottom 24.

The inclination S2 of the inner surface of the cylindrical portion 22 may be expressed as follows:

$$\tan(S2) = g/(r \times \omega^2) \quad (1)$$

$$\omega 2 = x \times \pi \times n \quad (2)$$

where g is the gravitational acceleration (9.8 m/s$^2$), r is the distance between the center of rotation of the ball balancer 200 and the center of each ball 21 (m), ω is the angular velocity (rad/s), π is the circularity, and n is the rotational speed (rps).

Since the amplitude of vibration is much smaller than an inner diameter of the cylindrical portion 22, an error in the equation (1) is small if r may be the distance between the center of the cylindrical portion 22 and the center of each ball 21.

Specifically, when the rotor speed exceeds a speed at which the value of S2 derived in the equation (1) becomes equal to the inclination S1, it will cause the balls 21 to be lifted away from the annular bottom 24. The rotor speed at which the balls 21 are lifted up may, thus, be determined based on the inclination S1 and the radius of the lower surface of the cylindrical portion 22 with which each ball 21 is in contact (i.e., the interval between the lower surface of the cylindrical portion 22 and the axis of rotation of the ball balancer 200). This also determines a lower speed range of the rotor 8 within which the balls 21 are kept aligned on the annular bottom 24 without being lifted up and biased by a dynamic unbalance of the rotating system. This embodiment eliminates the influence of movement of the balls 21 in the ball balancer 200 on the rotation of the rotor 8 at the resonant speed by setting the rotor speed, at which the balls 21 start to be lifted up, higher than the resonant speed at which oscillation of the rotor 8 (i.e., the rotating system) is increased greatly.

Figure 3:
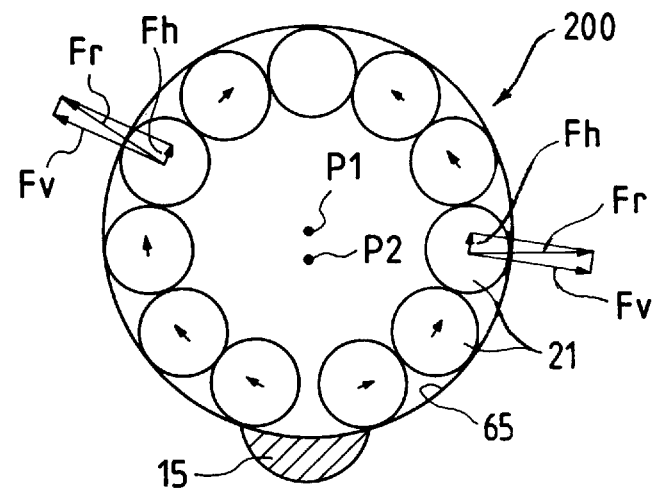
FIG. 3 is a plan view which shows balls within a ball balancer just after being lifted up when the ball balancer spins at high speed.

The ball balancer 200, if used with a centrifuge wherein a rotor is revolved at 3,000 rpm, and the resonant speed is 400 to 450 rpm, may be designed, as one example, to have the following specifications:

1. the radius of curvature of the cylindrical portion 22 of the balancer body 20 is 200 mm
2. the radius of a lower inner surface of the cylindrical portion 22 with which each ball 21 is in contact (i.e., an interval between the lower inner surface and an axis of rotation of the ball balancer 200) is 52 mm
3. the diameter of each ball 21 is 22 mm
4. the height between the annular bottom 24 and the level 23 is 28 mm FIG. 3 shows the inside of the ball balancer 200 just after some of the balls 21 leave the annular bottom 24 when the rotor 8 spins at high speed greater than the resonant speed.

The center of rotation P2 of the ball balancer 200 is shifted by the unbalanced mass 15 from the center P1 of the cylindrical portion 22 near the center of gravity of the rotating system (including the rotor 8. the ball balancer 200, etc.). The centrifugal force Fr acting on each ball 21 is, as clearly shown in the drawing. directed radially from the center of rotation P2 and may be divided into a vertical component Fv in a direction perpendicular to the circumference of the inner side wall 65 of the cylindrical portion 22 and a horizontal component Fh in a direction perpendicular to the vertical component Fv. The horizontal component Fh moves each ball 21 away from the unbalanced mass 15 along the inner side wall 65 of the cylindrical portion 22 so that the balls 21 will be collected close to each other on the opposite side of the unbalanced mass 15.

Figure 4:
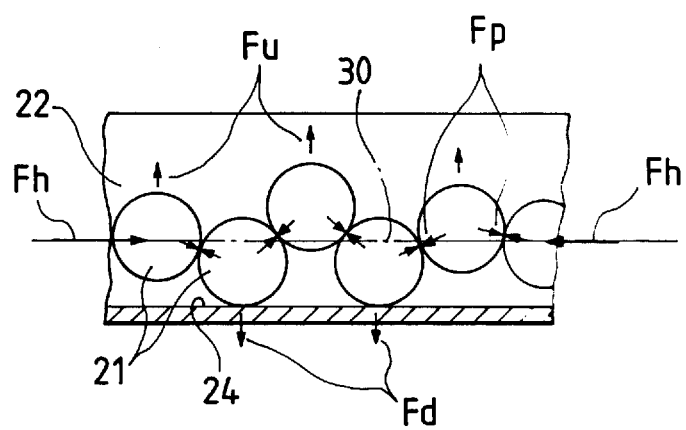
FIG. 4 is a development, as viewed from P1 in FIG. 3, showing the balls collected on the opposite side of an unbalanced mass 15.

FIG. 4 is a development, as viewed from P1 in FIG. 3, showing the balls 21 which begin to be biased or collected on the opposite side of the unbalanced mass 15. After leaving the annular bottom 24, the balls 21 are all moved up to the level 30 at which the angle S2 between the resultant force Ft and the horizontal line is matched with the inclination S1 of the inner surface of the cylindrical portion 22 with which each ball 21 is in contact and then collected close to each other by the horizontal components Fh of the centrifugal forces Fr, after which some of the balls 21 are shifted upward from the level 30, while the others are shifted downward from the level 30 due to differences in rolling friction between the balls 21. The horizontal component Fh of the centrifugal force Fr moving each ball 21 in a circumferential direction of the cylindrical portion 22 causes a reaction force Fp to be developed from adjacent one. When the balls 21 are shifted up and down as viewed in FIG. 4, the reaction forces Fp produce upward components Fu and downward components Fd, respectively. The upward components Fu further push up some of the balls 21 shifted upward from the level 30, while the downward components Fd further push down the others shifted downward from the level 30. Specifically, the balls 21 are collected within the ball balancer 200 on the opposite side of the unbalanced mass 15 by the horizontal components Fh of the centrifugal forces Fr and arranged, as clearly shown in FIG. 4, in staggered fashion by the upward and downward components Fu and Fd of the reaction forces Fp.

Figure 5:
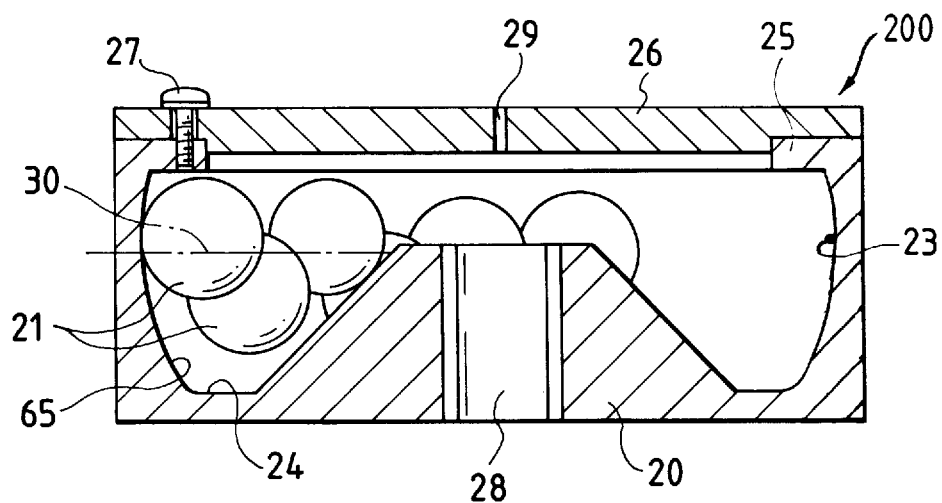
FIG. 5 is a vertical cross sectional view which shows an arrangement of the balls within the ball balancer of FIG. 1 during high-speed rotation.

FIG. 5 shows the balls 21 which have been lifted away from the annular bottom 24 and collected on the opposite side of the unbalanced mass 15 while the rotor 8 is spinning at a high speed above the resonant speed. The balls 21 continue to be biased or moved toward the opposite side of the unbalanced mass 15 until the horizontal component Fh of the centrifugal force Fr proportional to the shift between the center P1 of the cylindrical portion 22 and the center of rotation P2, a downward force pushing down the upward shifted balls 21 toward the level 30 that is the resultant force of the gravitational force and a downward component of the centrifugal force Fr, and an upward force pushing up the downward shifted balls 21 toward the level 30 that is the difference between the gravitational force and an upward component of the centrifugal force Fr, are balanced.

Therefore, increasing the radius of curvature of the inner side wall 65 of the cylindrical portion 22 decreases the downward and upward forces acting on the balls 21, resulting in an increase in relative activity of the horizontal component Fh of the centrifugal force Fr, which allows the balls 21 to be shifted more greatly across the level 30. Specifically, the overall weight of the balls 21 is concentrated in a narrower angular range opposite the unbalanced mass 15 to provide a greater counterbalance to the rotating system. This results in greatly reducing the vibration of the rotor 8 during high-speed rotation.

In test, the rotor 8 were revolved at 3000 rpm using the ball balancer 20 within which the balls 21 having a diameter of 22 mm were disposed. A maximum inner diameter 23 of the inner side wall 65 was 110 mm. The radius of curvature of the inner side wall 65 was 200 mm. The test results showed that the vibration generated during high-speed rotation of the rotor 8 were reduced below about one-fifth that generated in a conventional system without use of the ball balancer 200.

Figure 6:
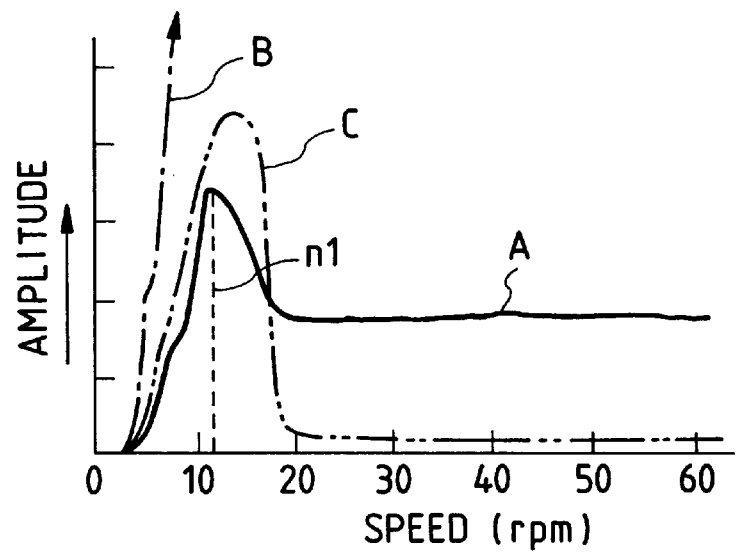
FIG. 6 is a graph which shows the relations between amplitude of rotor vibration and rotor speed when three types of conventional centrifuges are accelerated slowly.

FIG. 6 shows the relations between amplitude of rotor vibration and rotor speed when three types of conventional centrifuges are accelerated slowly. The solid line A indicates a variation in amplitude of a rotor vibration in the first conventional centrifuge wherein mixtures to be separated adds an unbalanced mass to a rotor and shows that the amplitude of the rotor vibration is maximized when the rotor speed reaches a resonant speed n1 determined by the mass of the rotor and a rotor-driving motor and the spring coefficient of a damping system consisting of elastic components such as the spring 5 and the rubber tube 6 used in the centrifuge 100 of the invention and kept at a relatively high level even after the rotor speed exceeds the resonant speed n1. In this case, the mechanical noise caused by vibration of the rotor and loads acting on a rotor shaft and a bearing are small during low-speed rotation, but when the amplitude of rotor vibration becomes great during high-speed rotation, greater loads act on the rotor shaft and the bearing, thereby increasing the mechanical noise and causing the rotor shaft and the bearing to be damaged prematurely.

Figure 21:
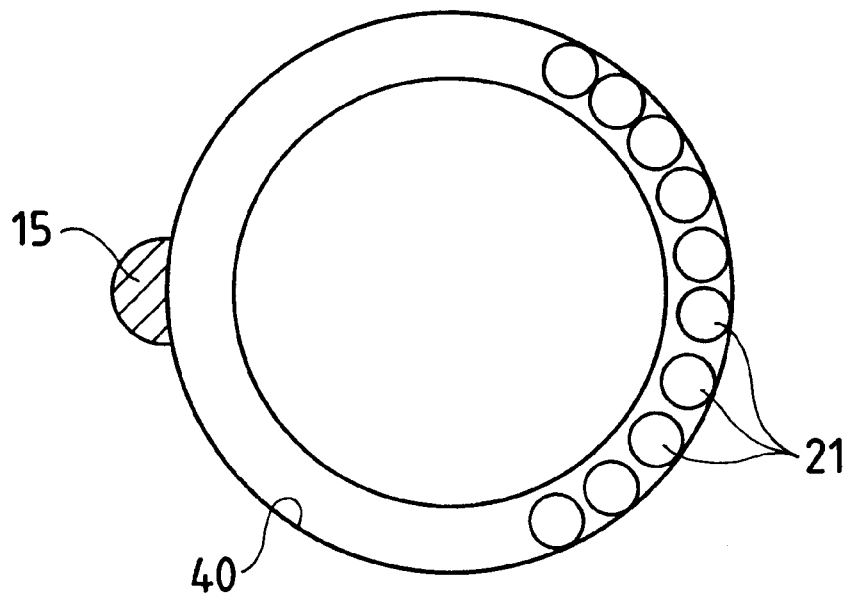
FIG. 21 is a plan view which shows a conventional ball balancer.
Figure 22:
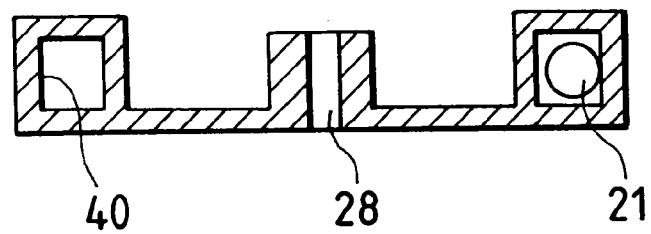
FIG. 22 is a vertical cross sectional view of FIG. 21.

The broken line B indicates a variation in amplitude of a rotor vibration in the second conventional centrifuge equipped with the ball balancer, as shown in FIGS. 21 and 22, when mixtures to be separated adds to a rotor substantially the same unbalanced mass as that in the fist conventional centrifuge indicated by the solid line A. In this case, the amplitude of the rotor vibration is elevated rapidly as the rotor speed approaches the resonant speed n1, but the rotor speed cannot exceed the resonant speed n1 due to a dynamic unbalance of the rotor.

The two-dot chain line C indicates a variation in amplitude of a rotor vibration in the third conventional centrifuge equipped with the ball balancer, as shown in FIGS. 21 and 22, when the weights of mixtures to be separated within a rotor are balanced to minimize a dynamic unbalance of the rotor during rotation. In this case, when the rotor speed reaches the resonant speed n1, the balls within the ball balancer are biased, thereby increasing the amplitude of the rotor vibration as compared with the line A, but the amplitude of the rotor vibration is decreased rapidly when the rotor speed exceeds the resonant speed n1.

It will be appreciated that the conventional ball balancer has the advantage that the amplitude of rotor vibration is reduced within a high-speed range above the resonant speed n1, but encounters the drawback in that the amplitude of rotor vibration becomes great when the rotor speed reaches the resonant speed n1.

Figure 7:
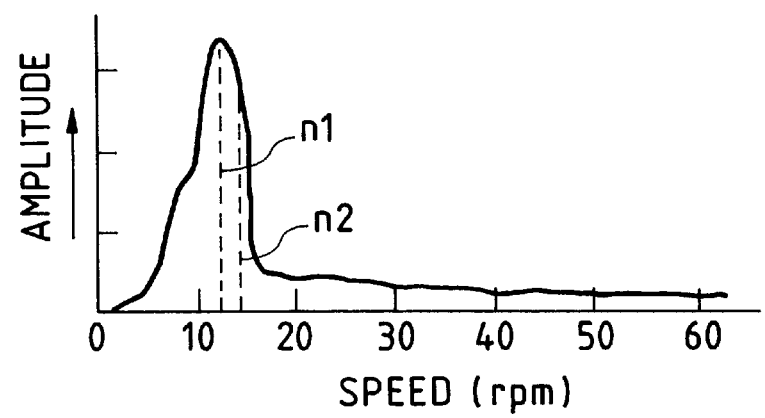
FIG. 7 is a graph which shows relations between amplitude of rotor vibration and rotor speed in the centrifuge of the invention in FIG. 1.

FIG. 7 shows the relations between the amplitude of rotor vibration and rotor speed in the centrifuge 100 of the invention when the unbalanced mass 15 is substantially the same as that in the first conventional centrifuge indicated by the solid line A in FIG. 6. The amplitude of the rotor vibration is changed like the one indicated by the line A in FIG. 6 within a low-speed range from the start of rotation of the rotor 8 to the speed n2 at which the balls 21 are lifted away from the annular bottom 24 of the ball balancer 200. When the rotor speed exceeds the speed n2, the balls 21 are moved upward along the inner side wall 65 of the cylindrical portion 22 and collected on the opposite side of the unbalanced mass 15. which counterbalances the unbalanced mass 15, thus resulting in a decrease in amplitude of the rotor vibration. When the rotor speed is increased further, the ratio of the centrifugal force Fr to the gravitational force Fg acting on the balls 21 becomes great. This increases the horizontal component Fh of the centrifugal force Fr, so that the balls 21 are concentrated in a narrower angular range within the ball balancer 200, thereby resulting in a more decrease in amplitude of the rotor vibration.

Figure 8:
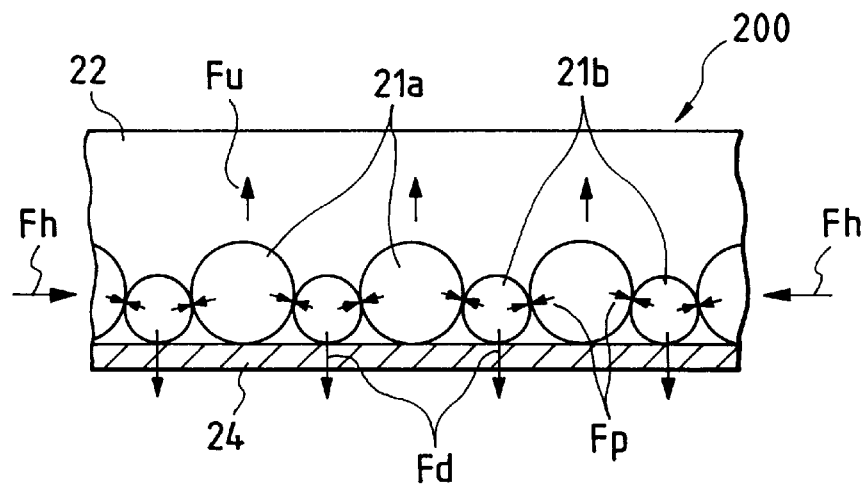
FIG. 8 is a development which shows an arrangement of balls disposed within a ball balancer according to the second embodiment of the invention.

FIG. 8 shows the second embodiment of the ball balancer 200 which is different from the above first embodiment only in that large-diameter balls 21a and small-diameter balls 21b are arranged alternately within the ball balancer 200. Other arrangements are identical, and explanation thereof in detail will be omitted here. While the rotor 8 is spinning at a low speed less than or equal to the resonant speed, the balls 21a and 21b are aligned on the annular bottom 24 without being biased, so that the center of each of the large-diameter balls 21a lies at a level higher than the center of each of the small-diameter balls 21b. When the rotor 8 continues to spin in an unbalanced condition, the horizontal component Fh of the centrifugal force Fr moving each of the balls 21a and 21b in a horizontal direction causes the reaction force Fp to be developed from adjacent one. The reaction force Fp, as already described, consists of the upward component Fu and the downward component Fd. The upward component Fu pushes each of the large-diameter balls 21a upward, while the downward component Fd pushes each of the small-diameter balls 21b downward. When the speed of the rotor 8 exceeds the resonant speed, the balls 21a and 21b are, like the first embodiment, lifted away from the annular bottom 24, and the large-diameter balls 21a are shifted upward by the upward component Fu, while the small-diameter balls 21b are shifted downward by the downward component Fd. The balls 21a and 21b are biased in staggered fashion to the opposite side of the unbalanced mass 15 to counterbalance the unbalanced mass 15. Specifically, in this embodiment, immediately after leaving the annular bottom 24, the balls 21a and 21b are arranged quickly in staggered fashion, reducing the oscillation of the rotor 8.

The large-diameter balls 21a and the small-diameter balls 21b may alternatively be so disposed within the balancer body 20 that two or more of the large-diameter balls 21a or the small-diameter balls 21b are arranged adjacent each other.

Figure 9:
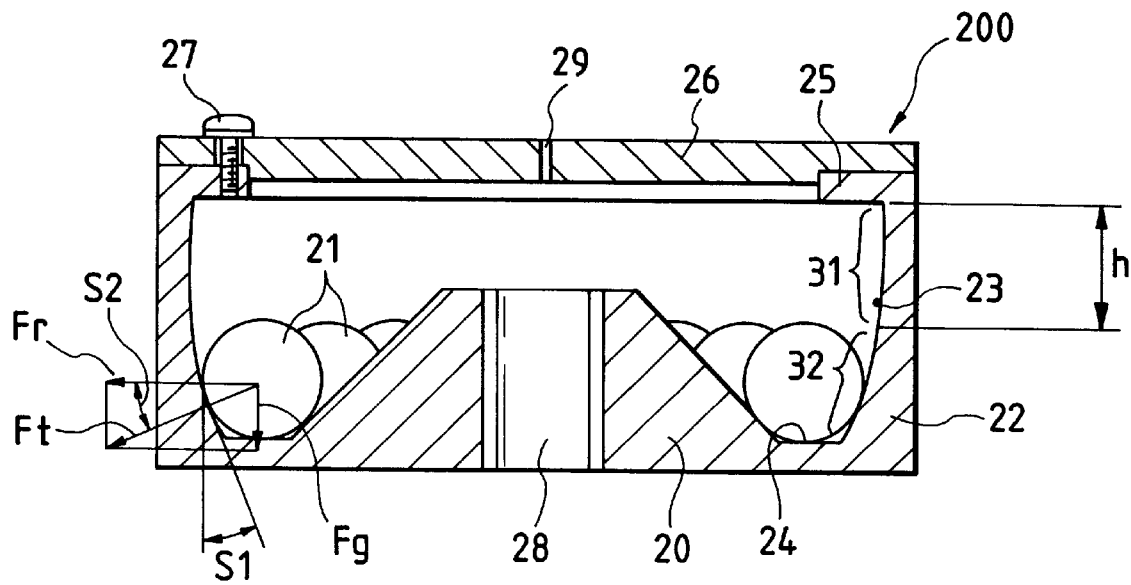
FIG. 9 is a vertical cross sectional view which shows a ball balancer during low-speed rotation according to the third embodiment of the invention.
Figure 10:
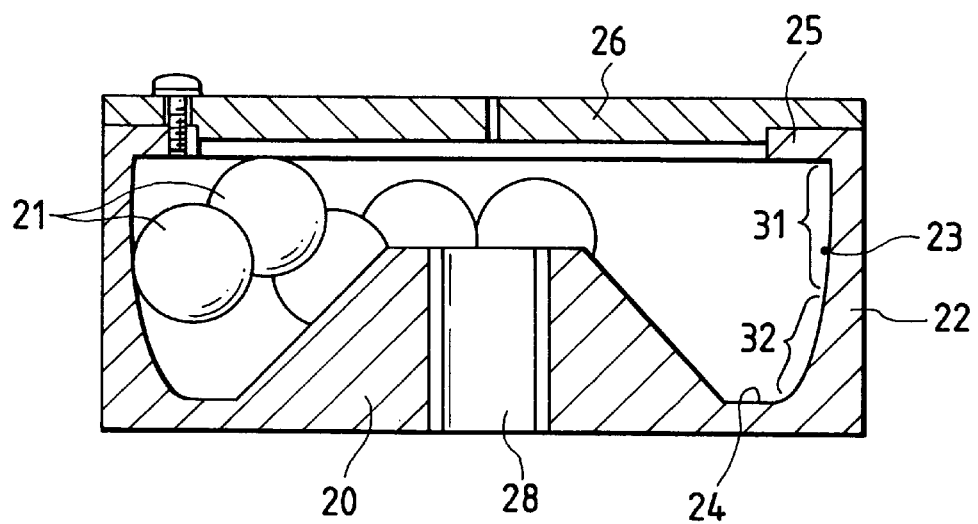
FIG. 10 is a vertical cross sectional view which shows the movement of balls within the ball balancer in FIG. 9 when rotated at high speed.

FIGS. 9 and 10 show the third embodiment of the ball balancer 200. FIG. 9 shows the balls 21 when the rotor 8 or the ball balancer 200 spins at a low speed less than or equal to the resonant speed, while FIG. 10 shows the balls 21 when the ball balancer 200 spins at a high speed greater than the resonant speed.

In this embodiment, the inside of the cylindrical portion 22 of the balancer body 20 consists of an upper inner wall 31 and a lower inner wall 32. The upper inner wall 31 has a radius of curvature greater than that of the lower inner wall 32 or may alternatively be a flat surface extending in parallel to an axis of rotation of the balancer body 20 (i.e., the shaft 11 in FIG. 1). The height h of the upper inner wall 31 is 1.4 or more times greater than the diameter of each ball 21 and allows the balls 21 to be arranged in staggered fashion within the balancer body 20 during rotation of the rotor 8 at a speed higher than the resonant speed. The inner diameter of a lower portion of the lower inner wall 32 and the inclination S1 are so determined that the rotor speed when the balls 21 are lifted away from the annular bottom 24 is greater than the resonant speed in order to eliminate the influence of the movement of the balls 21 in the ball balancer 200 on the rotor 8 during oscillation at the resonant speed. The lower inner wall 31 continues the upper inner wall 31 smoothly without any protrusions. Other arrangements are identical with those of the first embodiment, and explanation thereof in detail will be omitted here.

In operation, when the rotor 8 spins at a speed higher than the resonant speed, the balls 21 are, as shown in FIG. 10, lifted up to the upper inner wall 31. The upper inner wall 31 has, as described above, the radius of curvature greater than that of the lower inner wall 32 or a flat surface. Especially, in the case of the flat surface, the downward force pushing down some of the balls 21 upward shifted and the upward force pushing up the others downward shifted, as discussed with reference to FIG. 5, become much smaller than those produced in the above embodiments, respectively. Specifically, when the balls 21 reaches the upper inner wall 31, the upward force is decreased to about zero, while most of the downward force is provided by the gravitational force. The upward and downward forces, therefore, become smaller than the horizontal component Fh of the centrifugal force Fr acting on the balls 21 horizontally to bring the balls 21 into the staggered arrangement, thereby causing the balls 21 to be biased quickly toward the opposite side of the unbalanced mass 15. This results in a decreased in residual unbalance after the rotor speed exceeds the resonant speed.

Figure 11:
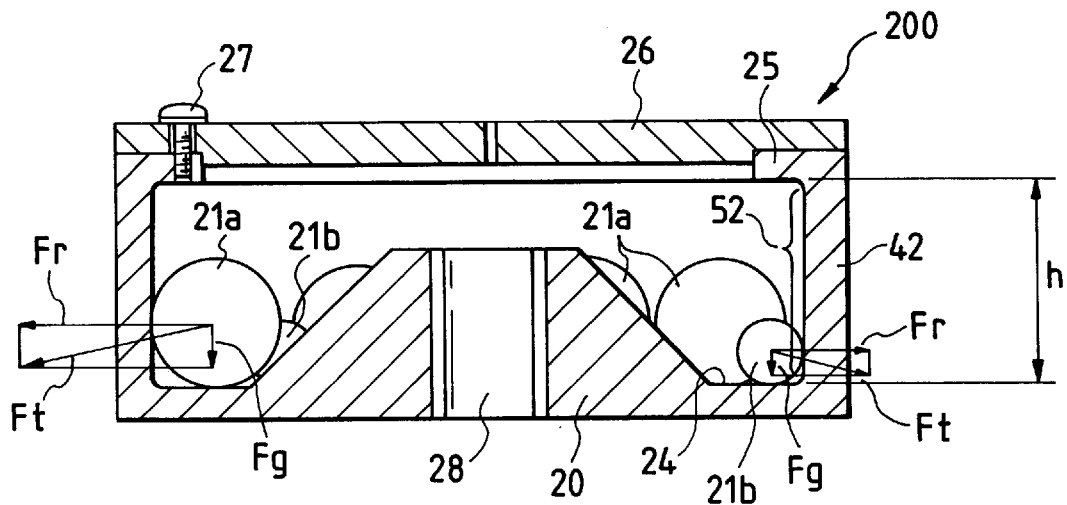
FIG. 11 is a vertical cross sectional view which shows a ball balancer during low-speed rotation according to the fourth embodiment of the invention.
Figure 12:
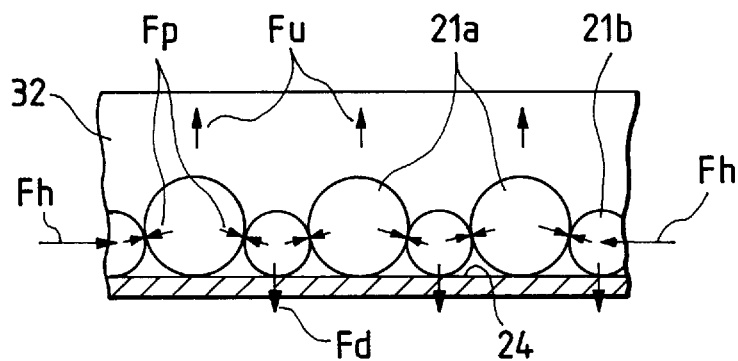
FIG. 12 is a development which shows the movement of balls when the speed of the ball balancer of FIG. 11 exceeds a resonant speed.
Figure 13:
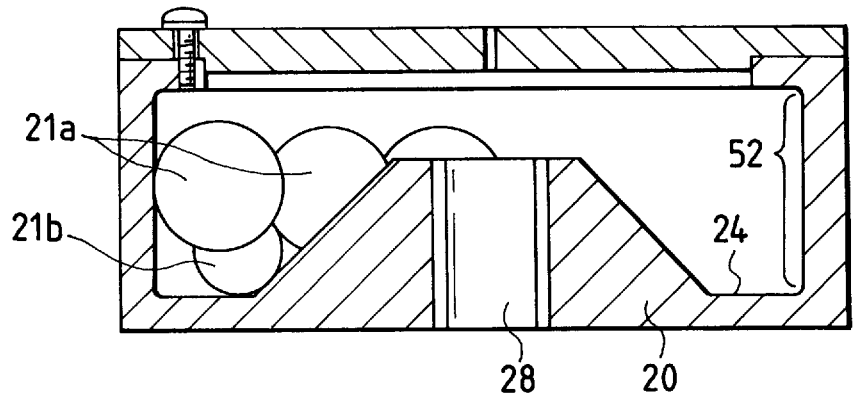
FIG. 13 is a vertical cross sectional view which shows an arrangement of the balls when the ball balancer of FIG. 11 is rotated at high speed.

FIGS. 11 to 13 show the fourth embodiment of the ball balancer 200 which is a modification of the second embodiment as shown in FIG. 8. FIG. 11 shows the ball balancer 200 when rotating at a low speed less than or equal to the resonant speed.

The balancer body 20 includes a cylindrical portion 42 having a flat inner side wall 52 extending in parallel to the axis of rotation (i.e., the rotor 11 in FIG. 1) of the ball balancer 200. The large-diameter balls 21a and the small-diameter balls 21b are arranged alternately and occupy substantially the overall length of the annular bottom 24. The annular bottom 24 has the width allowing the large-diameter balls 21a to be placed in contact with the annular bottom 24. The height h of the inner side wall 52 is smaller than the sum of diameters of each of the large-diameter balls 21a and each of the small-diameter balls 21b and allows the balls 21a and 21b to be arranged in a row in the staggered fashion during high-speed rotation of the ball balancer 200, but prevents one of the large-diameter balls 21a from being changed in position with adjacent one of the small-diameter balls 21b.

The resultant force Ft of the gravitational force Fg and centrifugal force Fr acts, as clearly shown in FIG. 11, on the cylindrical portion 42 diagonally downward. Thus, if there is no unbalanced mass, the balls 21a and 21b occupy the overall length of the annular bottom 24 without being biased to on side of the cylindrical portion 42 even when the rotor 8 spins at a speed higher than the resonant speed.

FIG. 12 is a development, as viewed from the center of the cylindrical portion 42 in a direction opposite an unbalanced mass of the rotor 8, which shows the inside of the ball balancer 200 when the rotor speed exceeds the resonant speed.

The balls 21a and 21b are urged by the horizontal components Fh of the centrifugal forces Fr into close arrangement, developing the reaction forces Fp each exerted from adjacent one of the balls 21a and 21b. The reaction forces Fp, as described above, each produce the upward and downward components Fu and Fd. The upward components Fu push the large-diameter balls 21a upward, while the downward components Fd push down the small-diameter balls 21b downward. Each of the components Fu and Fd is determined in a relation to the centrifugal force Fr, a shift between the center P1 of the cylindrical portion 42 and the center of rotation P2 caused by the presence of the unbalanced mass of the rotor 8, and a difference in height between the center of the large-diameter ball 21a and the center of the small-diameter ball 21b, in other words, a difference in diameter between the large-diameter balls 21a and the small-diameter balls 21b. In this embodiment, the inner diameter of the cylindrical portion 42 and the difference in diameter between the large-diameter balls 21 a and the small-diameter balls 21b are so determined that the rotor speed at which the large-diameter balls 21a are lifted away from the annular bottom 24 by the centrifugal force acting on the large-diameter balls 21a and the small-diameter balls 21b is greater than the resonant speed at which the oscillation of the rotor 8 is increased greatly.

FIG. 13 shows the inside of the ball balancer 200 when the rotor 8 spins at a speed higher than the resonant speed. After the rotor speed exceeds the resonant speed, the balls 21a and 21b are lifted away from the annular bottom 24 and then collected, as shown in the drawing, on the opposite side of the unbalanced mass of the rotor 8 in staggered arrangement wherein the large-diameter balls 21a are put on the small-diameter balls 21b by the upward components Fu of the reaction forces Fp each exerted from adjacent one of the small-diameter balls 21b. Each of the upward components Fu is proportional to the square of the speed of the rotor 8, but the downward force pushing down the upward shifted balls 21a is provided in this embodiment only by the gravitational force that is a constant value. Therefore, when the rotor speed exceeds the resonant speed, the large-diameter balls 21a are moved upward quickly, and all the balls 21a and 21b are collected in staggered arrangement to the opposite side of the unbalanced mass of the rotor 8.

This embodiment allows the cylindrical portion 42 to be decreased in height as compared with the above embodiments, thus resulting in a decreased size of the ball balancer 200.

Figure 14:
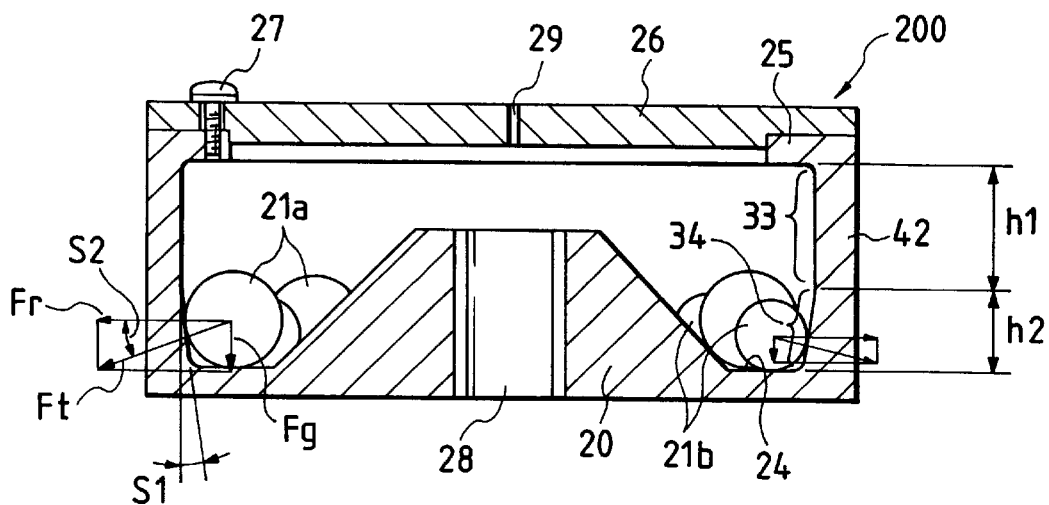
FIG. 14 a vertical cross sectional view which shows a ball balancer during low-speed rotation according to the fifth embodiment of the invention.
Figure 15:
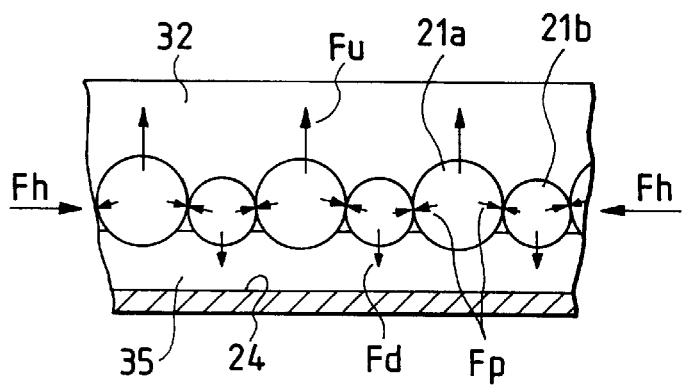
FIG. 15 is a development which shows the movement of balls just after being lifted up when the ball balancer of FIG. 14 spins at high speed.
Figure 16:
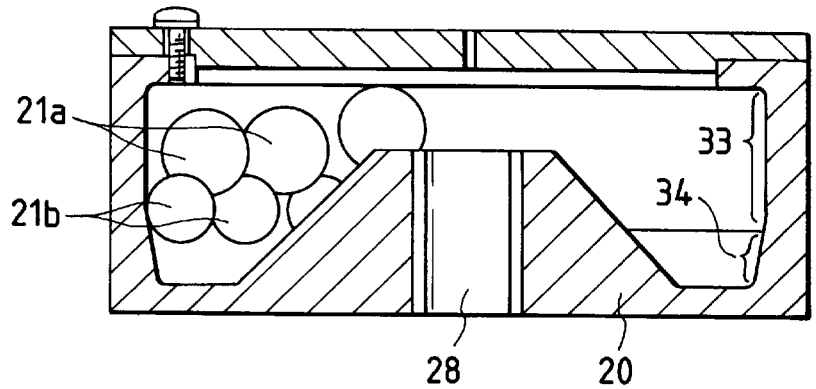
FIG. 16 is a vertical cross sectional view which shows an arrangement of the balls collected on one side of the ball balancer of FIG. 14 during high-speed rotation.

FIGS. 14 to 16 shows the fifth embodiment of the ball balancer 200 which is a modification of the fourth embodiment as shown in FIGS. 11 to 13. FIG. 14 shows the ball balancer 200 when rotating at a speed lower than the resonant speed.

The balancer body 20 includes a cylindrical portion 42 having an upper inner wall 33 and a lower inner wall 34. The upper inner wall 33 has a flat surface extending in parallel to the axis of rotation (i.e., the shaft 11 in FIG. 1) of the ball balancer 200. The lower inner wall 34 has a flat surface inclined at a given angle relative to the upper inner wall 33 so as to have a smallest diameter at a lower end thereof continuing the annular bottom 24. The height h1 of the upper inner wall 33 is approximately 1.5 times the diameter of the large-diameter balls 21a, which allows the balls 21a and 21b to be arranged in the staggered fashion during high-speed rotation of the rotor 8. The height h2 of the lower inner wall 34 is greater than the radius of the large-diameter balls 21a. The annular bottom 24 has the width allowing only one of the large-diameter balls 21a to be placed on the annular bottom 24 in a widthwise direction. The large-diameter and small-diameter balls 21a and 21b are arranged alternately and occupy substantially the overall length of the annular bottom 24. Other arrangements are identical with those of the fourth embodiment, and explanation thereof in detail will be omitted here.

FIG. 15 is a development, as viewed from the center of the cylindrical portion 42 in a direction opposite an unbalanced mass of the rotor 8, which shows the large- and small-diameter balls 21a and 21b just after ascending the inclined lower inner wall 34 when the rotor 8 spins at a speed higher than the resonant speed. After ascending up to a lower end of the upper inner wall 33, the balls 21a and 21b are moved along the boundary of the upper and lower inner walls 33 and 34 toward the opposite side of the unbalanced mass of the rotor 8 and collected close to each other by the horizontal components Fh of the centrifugal forces Fr acting on the balls 21a and 21b during rotation.

FIG. 16 shows the balls 21a and 21b collected on the opposite side of the unbalanced mass of the rotor 8 during rotation of the rotor 8 at a speed higher than the resonant speed. Upon ascending up to the upper inner wall 33 during rotation of the rotor 8 at a speed higher than the resonant speed, the balls 21a and 21b are biased toward the opposite side of the unbalanced mass of the rotor 8 and shifted up and down in staggered fashion wherein the large-diameter balls 21a are lifted on the small-diameter balls 21b by the upward and downward components Fu and Fd of the reaction forces Fp each exerted from adjacent one of the balls 21a and 21b. The downward force urging the large-diameter balls 21a downward after being lifted up to the upper inner wall 33 is provided only by the gravitational force. Therefore, upon reaching the upper inner wall 33, the large-diameter balls 21a are easily lifted up, so that the large- and small-diameter balls 21a and 21b are collected in staggered arrangement within a narrower angular range of the inside of the balancer body 20. Specifically, the overall weight of the large- and small-diameter balls 21a and 21b is concentrated within the narrower angular range opposite the unbalanced mass of the rotor 8 to counterbalance the unbalanced mass of the rotor 8, thus resulting in a great reduction in oscillation of the rotor 8.

Figure 17:
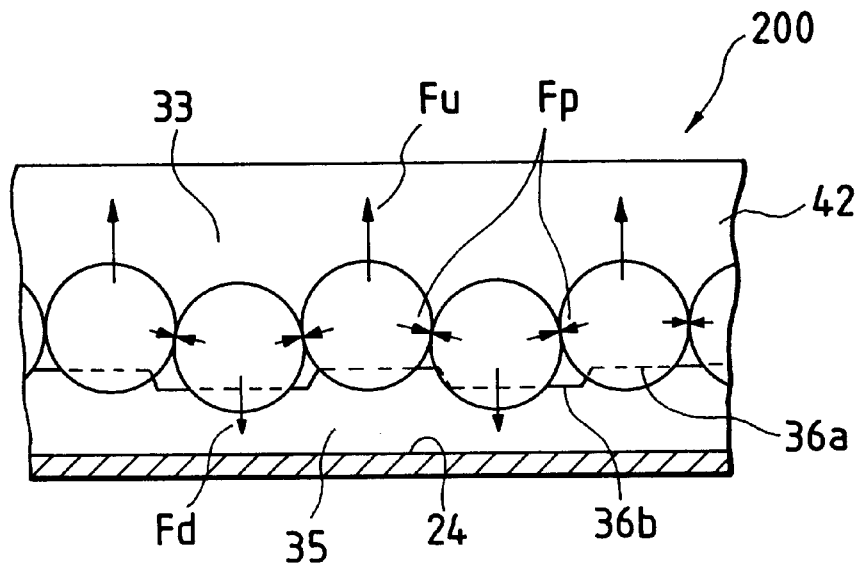
FIG. 17 is a development which shows the movement of balls within a ball balancer during rotation according to the sixth embodiment of the invention.

FIG. 17 shows the sixth embodiment of the ball balancer 200 of the invention.

The balls 21 have the same diameter. The balancer body 20 includes the cylindrical portion 42 having upper and lower inner walls 33 and 35. The upper inner wall 33 extends in parallel to an axis of rotation of the ball balancer 200 (i.e., the shaft 11 in FIG. 1), that is, it has the same diameter along the overall height thereof. The lower inner wall 35 has a flat surface inclined at a given angle relative to the axis of rotation of the ball balancer 200 so as to have the smallest diameter at a lower end thereof continuing the annular bottom 24. The lower inner wall 35 connects with the upper inner wall 33 through a step or shoulder portion. The shoulder portion extends along the overall inner periphery of the cylindrical portion 42 and projects inward in a widthwise direction from a lower end of the upper inner wall 33 to an upper end of the lower inner wall 35. The shoulder portion has, as clearly shown in the drawing, a plurality of protrusions 36a and recesses 36b formed alternately over the inner periphery of the cylindrical portion 42. The lengths of the protrusions 36a and the recesses 36b in a circumferential direction of the shoulder portion 37 are different from the diameter of the balls 21. When the rotor speed exceeds, for example, the speed n2 in FIG. 7 causing the balls 21 to be lifted away from the annular bottom 24, the balls 21 run onto the shoulder portion between the upper and lower inner walls 33 and 35, so that some of the balls 21 on the protrusions 36a are urged upward by the upward components Fu of the reaction forces each exerted from adjacent one of the balls 21 on the recess 36b. This causes the balls 21a to be arranged in staggered fashion and collected to the opposite side of the unbalanced mass of the rotor 8.

Figure 18:
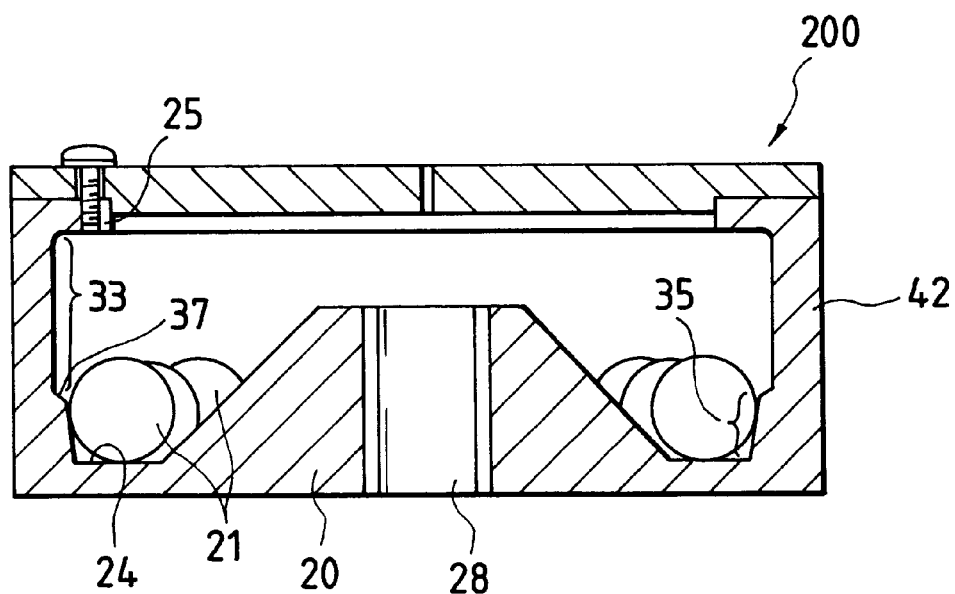
FIG. 18 is a vertical cross sectional view which shows a ball balancer according to the seventh embodiment of the invention.

FIG. 18 shows the seventh embodiment of the ball balancer 200 which is a modification of the one shown in FIG. 17 and different therefrom only in that a shoulder portion 37 having a flat upper surface is formed between the upper and lower inner walls 33 and 35. Other arrangements are identical, and explanation thereof in detail will be omitted here.

In this embodiment, upon ascending up to the shoulder portion 37, the balls 21 are shifted up and down due to a difference in rolling friction thereof and collected on the opposite side of the unbalanced mass of the rotor 8 in staggered arrangement.

Figure 19:
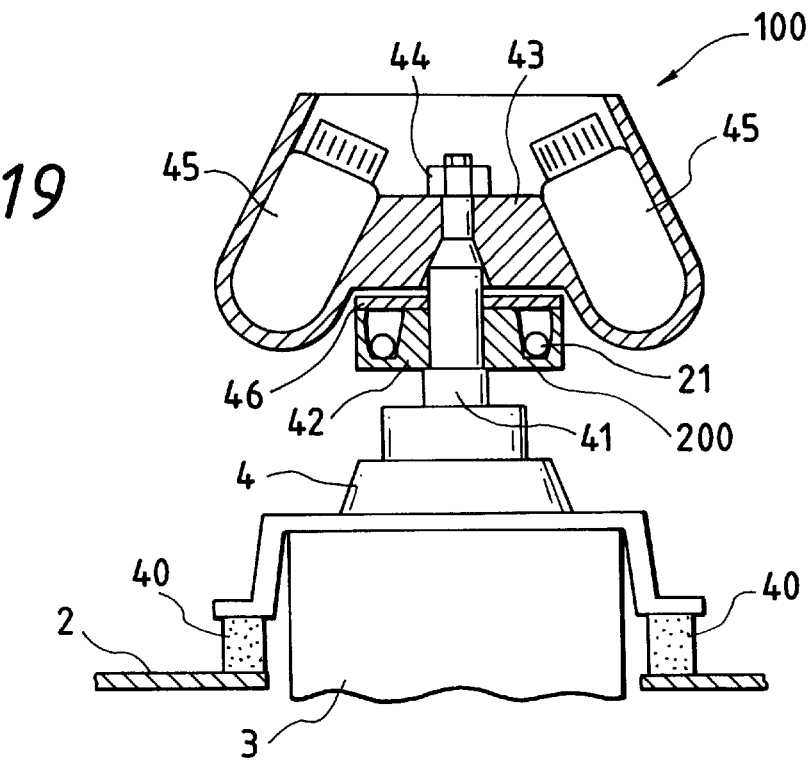
FIG. 19 is a vertical cross sectional view which shows a structure of a centrifuge according to the eighth embodiment of the invention.

FIG. 19 shows the eighth embodiment of the invention wherein any one of the ball balancers 200 of the above embodiments is used with the shown centrifuge 100.

A visco-elastic member 40 such as rubber having a spring/damping function is disposed between the bracket 4 and the base 2. The ball balancer 200 includes a balancer body 42 within which the balls 21 are disposed. The balancer body 42 is connected to a rotor shaft 41 which has a relatively higher rigidity and connects with the motor. The balancer body 42 is covered with a balancer cover 46. Bottles 45 within which mixtures to be separated are put are disposed in an angle rotor 43. The angle rotor 43 is included at a constant angle to the rotor shaft 41 and mounted on the rotor shaft 41 through a nut 44. The ball balancer 200 is, as clearly shown in the drawing, disposed beneath the angle rotor 43, which allows an operator of the centrifuge 100 to replace the angle rotor 43 without removing the ball balancer 200.

The ball balancer 200 can be of any type of the above embodiments. This embodiment offers the same effects as those of the above embodiments.

Figure 20:
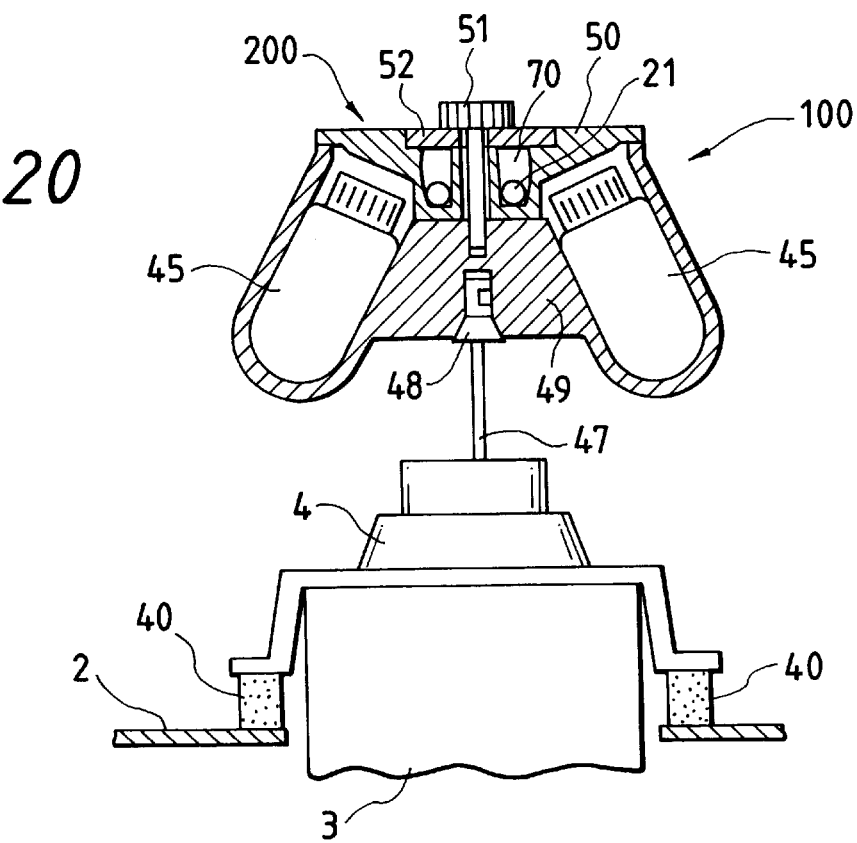
FIG. 20 is a vertical cross sectional view which shows a structure of a centrifuge according to the ninth embodiment of the invention.

FIG. 20 shows the ninth embodiment of the centrifuge 100 of the invention which is a modification of the eighth embodiment in FIG. 19.

A rotor shaft 47 is thinner than the rotor shaft 41 in FIG. 19 and has a lower rigidity. A crown 48 is installed on an upper end of the rotor shaft 47. An angle rotor 49 is rotatably supported by the crown 48 and has formed therein chambers with openings for tang the bottles 45 in and out. A rotor cover 50 is mounted on the angle rotor 49 to close the openings of the chambers. The rotor cover 50 has an annular chamber 70 formed therein coaxially with an axis of rotation of the angle rotor 49. The annular chamber 70 is closed by a cover 52 using a screw 51 and has disposed therein balls 21 to constitute a ball balancer 200. The annular chamber 70 may alternatively be formed directly in the angle rotor 49 above the crown 48. This is because in the case where the rigidity of the rotor shaft 47 is low, the oscillation of the rotor 49 during rotation at high speed will be caused by an unbalanced mass of a rotating system consisting of a portion of the rotor 49 above the crown 48, mixtures put in the bottles 45, the bottles 45, and the rotor cover 52.

The ball balancer 200 and the rotor 49 each can be of any type of the above embodiments.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A ball balancer for controlling a dynamic balance of a moving part of a rotating machine comprising:

a rotary balancer casing mounted on an axis of rotation coaxial with an axis of rotation of the moving part of the rotating machine, said rotary balancer casing including a cylindrical inner side wall and a bottom and having an annular race formed on the bottom along a periphery of the cylindrical inner side wall;

balls disposed on the annular race of said rotary balancer casing over a first angular range; and means for holding said balls arranged on the annular race over the first angular range within a lower-speed range of rotation of the moving part of the rotating machine less than or equal to a resonant speed that is a rotational speed of the moving part when matched with a natural frequency of a rotating system including the ball balancer and the moving part and that induces oscillation of the rotating system to increase, when the rotational speed of the moving part is increased out of the lower-speed range, said means biasing said balls to the opposite side of an unbalanced mass of the moving part, which initiates oscillation of the moving part, within a second angular range smaller than the first angular range, wherein the cylindrical inner side wall includes an upper portion and a lower portion which constitute said means, the lower portion being so curved outward of said rotary balancer casing at a given radius of curvature that an interval between the axis of rotation of said rotary balancer casing and an inner surface of the lower portion in a direction perpendicular to the axis of rotation of said rotary balancer casing is increased toward the upper portion and that an angle between a tangent passing through a point on the inner surface of the lower portion with which each of said balls is in contact and a vertical line allows said balls to be lifted away from the annular race along the inner surface of the lower portion by centrifugal force produced when the rotational speed of the moving part of the rotating machine exceeds the resonant speed.

2. A ball balancer as set forth in claim 1, wherein the upper portion of the cylindrical inner side wall is curved at the same radius of curvature as that of the lower portion and an interval between the axis of rotation of said rotary balancer casing and an inner surface of the upper portion in a direction perpendicular to the axis of rotation of said rotary balancer casing is decreased as leaving the lower portion.

3. A ball balancer as set forth in claim 1, wherein said upper portion of the cylindrical inner side wall is curved at a radius of curvature greater than that of the lower portion.

4. A ball balancer as set forth in claim 1, wherein said upper portion of the cylindrical inner side wall has a flat inner surface extending parallel to the axis of rotation of said rotary balancer casing.

5. A ball balancer as set forth in claim 1, wherein said balls includes a first group of large-diameter balls and a second group of small-diameter balls.

6. A ball balancer as set forth in claim 5, wherein the large-diameter balls and the small-diameter balls are arranged in alternate fashion.

7. A ball balancer for controlling a dynamic balance of a moving part of a rotating machine comprising:

a rotary balancer casing mounted on an axis of rotation coaxial with an axis of rotation of the moving part of the rotating machine, said rotary balancer casing including a cylindrical inner side wall and a bottom and having an annular race formed on the bottom along a periphery of the cylindrical inner side wall;

balls disposed on the annular race of said rotary balancer casing over a first angular range; and means for holding said balls arranged on the annular race over the first angular range within a lower-speed range of rotation of the moving part of the rotating machine less than or equal to a resonant speed that is a rotational speed of the moving part when matched with a natural frequency of a rotating system including the ball balancer and the moving part and that induces oscillation of the rotating system to increase, when the rotational speed of the moving part is increased out of the lower-speed range, said means biasing said balls to the opposite side of an unbalanced mass of the moving part, which initiates oscillation of the moving part, within a second angular range smaller than the first angular range, wherein said balls includes a first group of large-diameter balls and a second group of small-diameter balls, a difference in diameter between the large-diameter balls and the small-diameter balls constituting said means.

8. A ball balancer as set forth in claim 7, wherein the large-diameter balls and the small-diameter balls are arranged in alternate fashion.

9. A ball balancer as set forth in claim 7, wherein the cylindrical inner side wall of said rotary balancer casing extends vertically in parallel to the axis of rotation of said rotary balancer casing, and wherein an inner diameter of the cylindrical inner side wall and the difference in diameter between the large-diameter balls and the small-diameter balls are so determined that the large-diameter balls are lifted away from the annular race by centrifugal force acting on the large-diameter balls and the small-diameter balls when the rotational speed of the moving part is increased out of the lower-speed range.

10. A centrifuge comprising:

(a) a rotating member; and (b) a ball balancer for controlling a dynamic balance of the rotating member, said ball balancer including, (1) a rotary balancer casing mounted on an axis of rotation coaxial with an axis of rotation of said rotating member, said rotary balancer casing including a cylindrical inner side wall and a bottom and having an annular race formed on the bottom along a periphery of the cylindrical inner side wall;

(2) balls disposed on the annular race of said rotary balancer casing over a first angular range; and (3) means for holding said balls arranged on the annular race over the first angular range within a lower-speed range of rotation of said rotating member less than or equal to a resonant speed that is a rotational speed of said rotating member when matched with a natural frequency of a rotating system including the ball balancer and said rotating member and that induces oscillation of the rotating system to increase, when the rotational speed of said rotating member is increased out of the lower-speed range, said means biasing said balls to the opposite side of an unbalanced mass of said rotating member, which initiates oscillation of said rotating member, within a second angular range smaller than the first angular range, wherein said rotating member includes a rotor rotatably supported by a shaft, said rotor including a rotor body and a cover, the rotor body having formed therein a plurality of chambers with openings for taking mixtures to be separated in and out, the cover being disposed on the rotor body to close the openings, further comprising a motor revolving said rotor through the shaft, and wherein said ball balancer is mounted in the cover of said rotor.

* * * * *